Patented July 7, 1942

2,288,779

UNITED STATES PATENT OFFICE 2,288,779

VULCANIZATION OF RUBBER

Theodore F. Bradley, Stamford, Conn., assignor to American Cyanamid Company, New York, N. Y., a corporation of Maine No Drawing. Application January 25, 1940, Serial No. 315,534

8 Claims. (Cl. 260—782)

This invention relates to vulcanization of rubber and more particularly to the control of the activity of accelerators employed in the vulcanization.

Sulfur-bearing materials such as mercaptobenzothiazole, benzothiazyl disulfide and the like have been used as accelerators of the vulcanization of rubber. Other accelerators used may be classified as organic sulfur compounds which are acidic or which hydrolyze to produce mercaptans or thio acids. These accelerators, in general, become more active in the presence of certain basic substances including the diaryl guanidines, such, for example, as diphenyl guanidine, di-ortho-tolyl guanidine, phenyl-orthotolyl guanidine and the like. However, these latter substances are apt to cause set-up or "scorching" in the rubber during the preliminary processing such as milling, calendering, extruding, etc., prior to the desired vulcanizing of the rubber, and they may even cause premature vulcanization of the rubber during storage.

It is an object of the invention, therefore, to provide for the retardation of the activity of the diaryl guanidines when used as activators for the sulfur-bearing accelerators.

This and other objects are attained by incorporating in the rubber mix a diterpene-maleic anhydride addition product or adduct. The adduct which is a dibasic acid anhydride or a mixture of isomeric dibasic acid anhydrides may be hydrolysed in known manner to obtain the dibasic acid or acids which may be employed in place of the adduct. In the specification and claims it is intended that the term addition product or adduct include also the free dibasic acid or acids.

The diterpene-maleic anhydride adducts may be prepared by heating a diterpene of the formula $C_{20}H_{32}$ with maleic anhydride or its equivalent of maleic acid and purifying the resinous product by distillation to remove unreacted materials and traces of low molecular weight impurities. Water-soluble materials in the resinous residue such as unreacted maleic anhydride may be extracted with water. Such a process of preparing the addition products or adducts is more particularly described in my application, Serial Number 51,498 filed November 25, 1935, now Patent No. 2,208,321.

The non-volatile resinous residue obtainable in accordance with the above process consists essentially of dibasic acid anhydrides of unsaturated nature. Chemically, these anhydrides are probably a mixture of isomers having the formula $C_{24}H_{34}O_3$ and a molecular weight of 370.

The invention will be illustrated by the following examples to which, however, the invention is not to be limited. Unless otherwise specified, proportions are given by weight.

Example 1

Samples were compounded to contain diphenyl guanidine in each case. Two of the samples contained in adidtion dissimilar quantities of a diterpene-maleic anhydride adduct. The ingredients in the following proportions were incorporated in the rubber by milling the mix on rolls in the customary way.

|  | Compounds | | |
|---|---|---|---|
|  | A | B | C |
| Smoked sheets | 100 | 100 | 100 |
| Zinc oxide | 6 | 6 | 6 |
| Sulphur | 3 | 3 | 3 |
| Benzothiazyl disulfide | .75 | .75 | .75 |
| Diphenyl guanidine | .445 | .445 | .445 |
| Diterpene-maleic anhydride adduct |  | .80 | .40 |

These samples were then tested in a Williams plastometer at 100° C. using a three minute $y$ values in inches. The lower per cent change in the Williams "$y$" value at 100° C., after heating at 85° C., for the compounds containing the adduct indicates that they have scorched less or have a slower rate of set-up than the compound containing diphenyl guanidine alone.

|  | Compounds | | |
|---|---|---|---|
|  | A | B | C |
| No heat inches | .073 | .072 | .075 |
| After two hours in water at 85° C do | .230 | .079 | .131 |
| Change percent | +215 | +9.7 | +74.8 |

It can readily be seen from these tests that the adduct gives a slower rate of set-up than the diphenyl guanidine alone.

The samples were then tested at full cure:

| 25-minute cure at 130° C. | Compounds | | |
|---|---|---|---|
|  | A | B | C |
| Stress lbs./sq. in. at 500% elongation | 1,580 | 1,315 | 1,465 |
| Tensile lbs./sq. in | 4,245 | 4,100 | 4,140 |
| Percent elongation | 650 | 670 | 650 |

These tensile tests show that the diterpene-maleic anhydride adduct gives approximately the same physical properties as those obtained with the free or unretarded diphenyl guanidine.

In the following example diterpene-maleic anhydride adduct was tested as a retarder for di-ortho-tolyl guanidine in accordance with the procedure of Example 1.

*Example 2*

The samples were made up in the usual manner. As shown below one of the samples contained a quantity of adduct in addition to the di-ortho-tolyl guanidine.

|  | Compounds | |
|---|---|---|
|  | D | E |
| Smoked sheets | 100 | 100 |
| Zinc oxide | 6 | 6 |
| Sulfur | 3 | 3 |
| Benzothiazyl disulfide | .75 | .75 |
| Di-ortho-tolyl guanidine | .31 | .31 |
| Diterpene-maleic anhydride adduct | | .246 |

These samples were then given a set-up test in the Williams plastometer at 100° C. using a three minute "y" value in inches.

|  | Compounds | |
|---|---|---|
|  | D | E |
| No heat inches | .066 | .068 |
| After two hours in water at 85° C do | .132 | .092 |
| Change percent | +100 | +35.3 |

The above results show that the adduct gave a slower rate of set-up than the di-ortho-tolyl guanidine alone.

The samples were then tested at full cure:

| 25-minute cure at 130° C. | Compounds | |
|---|---|---|
|  | D | E |
| Stress lbs./sq. in. at 500% elong | 1,455 | 1,395 |
| Tensile lbs./sq. in | 4,370 | 4,485 |
| Percent elongation | 665 | 680 |

These physical tests show that di-ortho-tolyl guanidine retarded with diterpene-maleic anhydride adduct gives practically the same physical properties as those obtained with the free di-ortho-tolyl guanidine.

The above examples demonstrate the utility of the adducts in reducing the activity at processing temperatures of the diaryl guanidine activators. It is to be noted that the delaying action of the adducts on the diaryl guanidines is effective regardless of the presence or absence of a sulfur-bearing accelerator. Accordingly, the adducts may be used to delay the action of the diaryl guanidines not only when the latter are employed as activators but also when they are present in the rubber as the sole accelerator. Well-known diaryl guanidine accelerators are diphenyl guanidine and di-ortho-tolyl guanidine.

The value of the adducts in the vulcanization of rubber is not, however, limited to their use with the diaryl guanidines, but they may be employed to retard the sulfur-bearing accelerators and especially the accelerators of this group which have the greater activity at the lower or processing temperatures.

The following example illustrates the capacity of the adducts to retard the sulfur-bearing accelerators. In this example the more active accelerator, mercaptobenzothiazole, was employed.

*Example 3*

A diterpene-maleic anhydride adduct in different quantities was incorporated in samples along with equal amounts of the accelerator. In addition one of the samples was made up to contain mercaptobenzothiazole alone. The several ingredients were compounded as follows.

|  | Compounds | | |
|---|---|---|---|
|  | F | G | H |
| Smoked sheets | 100 | 100 | 100 |
| Zinc oxide | 6 | 6 | 6 |
| Sulfur | 3 | 3 | 3 |
| Mercaptobenzothiazole | 1 | 1 | 1 |
| Stearic acid | 1 | 1 | 1 |
| Diterpene-maleic anhydride adduct | | .25 | .125 |

When tested in a Williams plastometer at 100° C. using a three minute "y" value in inches the following results were obtained.

|  | Compounds | | |
|---|---|---|---|
|  | F | G | H |
| No heat inches | .080 | .078 | .085 |
| After two hours in water at 85° C do | .140 | .103 | .122 |
| Change percent | +75 | +32 | +43.5 |

From the above it can be readily seen that the mercaptobenzothiazole was in each case retarded by the presence of the adduct.

The samples were then tested at full cure:

| 30-minute cure at 141° C. | Compounds | | |
|---|---|---|---|
|  | F | G | H |
| Stress lbs./sq. in. at 500% elongation | 520 | 490 | 500 |
| Tensile lbs./sq. in | 3,305 | 3,570 | 3,745 |
| Percent elongation | 815 | 825 | 830 |

The above tensile tests indicate that while the adducts retard mercaptobenzothiazole at 85° C., or at processing temperatures, they have little or no effect on the accelerator at the vulcanizing temperature.

It is an additional advantage of the present invention that the resinous adducts will more easily disperse in rubber than the activator retarders which are crystalline and have high melting points, such, for example, as benzoic acid, salicylic acid, etc.

The proportions given in the foregoing examples are not intended to be limiting of the invention since they may be varied, as will be understood by those skilled in the art, in accordance with the particular diaryl guanidine or sulfur-bearing accelerator employed, or in accordance with both of these ingredients.

The foregoing description of the invention is intended by way of illustration and not by way of limitation thereof, the scope of which is defined in the appended claims.

What I claim is:

1. The process which comprises vulcanizing rubber in the presence of a diterpene-maleic anhydride addition product and an organic sulfur-bearing vulcanization accelerator.

2. The process which comprises vulcanizing rubber in the presence of a diterpene-maleic anhydride addition product, a diaryl guanidine and an organic sulfur-bearing vulcanization accelerator.

3. The process of claim 2, in which the diaryl guanidine is diphenyl guanidine.

4. The process of claim 2, in which the diaryl guanidine is di-ortho-tolyl guanidine.

5. A vulcanizable rubber mix having incorporated therein a diterpene-maleic anhydride addition product and an organic sulfur-bearing vulcanization accelerator.

6. A vulcanizable rubber mix having incorporated therein a diterpene-maleic anhydride addition product, a diaryl guanidine and an organic sulfur-bearing vulcanization accelerator.

7. A vulcanizable rubber mix in accordance with claim 6, in which the diaryl guanidine is diphenyl guanidine.

8. A vulcanizable rubber mix in accordance with claim 6, in which the diaryl guanidine is di-ortho-tolyl guanidine.

THEODORE F. BRADLEY.